US010458462B2

(12) United States Patent
McBride et al.

(10) Patent No.: US 10,458,462 B2
(45) Date of Patent: Oct. 29, 2019

(54) STEERING COLUMN ENGINEERED TAPE (71) Applicants: THYSSENKRUPP PRESTA AG, Eschen (LI); THYSSENKRUPP AG, Essen (DE)

(72) Inventors: Stephen McBride, Brownsburg, IN (US); Bryce Welch, Indianapolis, IN (US); Christian Pichonnat, Indianapolis, IN (US)

(73) Assignees: ThyssenKrupp Presta AG, Eschen (LI); thyssenkrupp AG, Essen (DE)

( * ) Notice: Subject to any disclaimer, the term of this patent is extended or adjusted under 35 U.S.C. 154(b) by 172 days.

(21) Appl. No.: 15/677,392

(22) Filed: Aug. 15, 2017

(65) Prior Publication Data
US 2019/0055981 A1 Feb. 21, 2019

(51) Int. Cl.
B62D 1/181 (2006.01)
F16C 3/03 (2006.01)
B62D 1/185 (2006.01)
B62D 1/189 (2006.01)

(52) U.S. Cl.
CPC .............. F16C 3/03 (2013.01); B62D 1/181 (2013.01); B62D 1/185 (2013.01); B62D 1/189 (2013.01); F16C 2204/26 (2013.01); F16C 2204/60 (2013.01); F16C 2220/82 (2013.01); F16C 2226/40 (2013.01)

(58) Field of Classification Search
CPC .... F16C 3/03; F16C 2204/26; F16C 2204/60; F16C 2220/82; F16C 2226/40; B62D 1/181; B62D 1/185; B62D 1/189
USPC .......................................................... 74/493
See application file for complete search history.

(56) References Cited

U.S. PATENT DOCUMENTS

| 7,874,588 | B2 | 1/2011 | Cymbal |
| 8,549,953 | B2 | 10/2013 | Schnitzer |
| 8,714,048 | B2 | 5/2014 | Schnitzer |
| 2010/0307280 | A1* | 12/2010 | Schnitzer ............... B62D 1/185 74/493 |

(Continued)

FOREIGN PATENT DOCUMENTS

| DE | 102008049747 A1 | 4/2010 |
| DE | 102012104644 | 8/2013 |

(Continued)

OTHER PUBLICATIONS

International Search Report and Written Opinion for International Application No. PCT/EP2018/071803 dated Nov. 16, 2018, 13 pages.

Primary Examiner — Paul N Dickson
Assistant Examiner — Hilary L Johns
(74) Attorney, Agent, or Firm — RMCK Law Group PLC (57) ABSTRACT A steering column assembly for a motor vehicle constructed in accordance to one example of the present disclosure includes a box rocker, a column jacket and a first section of tape. The box rocker has a rocker body including a box rocker inner surface that defines a box rocker bore. The box rocker is configured to be fixed relative to the motor vehicle in an assembled position. The column jacket is configured to be slidably received into the box rocker bore. The column jacket has a column jacket outer diameter including an outer surface that opposes the box rocker inner surface. The first section of tape is disposed between the box rocker inner surface and the column jacket outer surface.

20 Claims, 8 Drawing Sheets (56) References Cited

U.S. PATENT DOCUMENTS

| | | |
|---|---|---|
| 2011/0150375 A1 | 6/2011 | Jaeger et al. |
| 2011/0262064 A1 | 10/2011 | Burgeff et al. |
| 2015/0135882 A1 | 5/2015 | Rauber et al. |
| 2016/0052536 A1 | 2/2016 | Nicolussi et al. |

FOREIGN PATENT DOCUMENTS

| | | | |
|---|---|---|---|
| DE | 102013103328 A1 | | 10/2014 |
| JP | H1053144 A | | 2/1998 |
| JP | 2007032324 A | | 2/2007 |
| JP | 5765628 B2 | | 8/2015 |
| KR | 20120032743 A | * | 4/2012 |

* cited by examiner

STEERING COLUMN ENGINEERED TAPE

FIELD

The present disclosure relates generally to a steering column for a motor vehicle and more specifically to a steering column assembly that incorporates engineered tape between an inner diameter of a box rocker and an outer diameter of a column jacket.

BACKGROUND

Steering columns in motor vehicles are generally adjustable so as to be able to adapt the position of the steering wheel to requirements of different drivers. In some arrangements the vehicle steering wheel is mounted to a telescoping column jacket that is supported within a box rocker. In general, at least portions of an outer diameter surface of the column jacket can be caused to ride along at least portions of an inner diameter of the box rocker during telescopic adjustment. It is desirable to mitigate wear between the column jacket and the box rocker and to further inhibit debris such as shavings that may discharged onto the mating surfaces. While some prior art configurations incorporate rigid sleeves, such as those formed of plastic or metal, between the column jacket and box rocker a need in the art exists to provide a better solution.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A steering column assembly for a motor vehicle constructed in accordance to one example of the present disclosure includes a box rocker, a column jacket and a first section of tape or film. The box rocker has a rocker body including a box rocker inner surface that defines a box rocker bore. The box rocker is configured to be fixed relative to the motor vehicle in an assembled position. The column jacket is configured to be slidably received into the box rocker bore. The column jacket has a column jacket outer diameter including an outer surface that opposes the box rocker inner surface. The first section of tape is disposed between the box rocker inner surface and the column jacket outer surface.

According to additional features, the first section of tape is at least partially adhered to the box rocker inner surface. The first section of tape is further adhered to a face surface of the box rocker body. The first section of tape is positioned generally around an upper circumference of the box rocker bore. In one example, the first section of tape is configured to compress between 20% and 25%.

In other features, the column jacket further comprises an inner jacket tube that opposes the first section of tape. The box rocker includes a fluted section provided by a plurality of radially stepped in surfaces and a plurality of radially stepped out surfaces. In one configuration, the section of tape is positioned on at least two adjacent radially stepped in surfaces of the plurality of radially stepped in surfaces. The plurality of stepped in surfaces collectively provide the box rocker inner surface. In one example, the inner surface of the box rocker and the outer surface of the column jacket are substantially concentric.

In additional features, the column jacket is configured to translate within the box rocker bore. During translation, the outer surface of the column jacket is caused to slidably ride along the first section of tape disposed on the inner surface of the box rocker. The column jacket can be formed of steel. The box rocker can be formed of magnesium. In one example, the first section of tape has a thickness of between 0.05 mm and 0.5 mm, preferably between 0.1 mm and 0.2 mm and especially preferred between 0.12 mm and 0.18 mm. The first section of tape has one of acrylic or silicone pressure sensitive adhesive.

According to still additional features, the steering column assembly further comprises a second section of tape or film, distinct from the first section of tape and disposed between the box rocker inner surface and the column jacket outer surface. The first and second sections of tape are of different geometries having distinct footprints. The steering assembly can additionally include a third section of tape, distinct from the first and second sections of tape and disposed between the box rocker inner surface and the column jacket outer surface.

A method of assembling a column jacket relative to a box rocker of a steering column assembly for a motor vehicle is provided. A mating contact surface of the box rocker is identified. A first section of tape is disposed onto the inner surface of a box rocker at the contact surface. The column jacket is slidably inserted into a bore defined by the inner surface of the box rocker. An outer surface of the column jacket slidably advances along the first section of tape mitigating surface to surface contact between the column jacket and the box rocker.

According to other features, the first section of tape or film is cut from a roll or sheet of tape or film. The first section of tape corresponds to a desired area of the inner surface of the box rocker. Disposing the first section of tape can further comprise cutting slots into the tape to create tabs. The tabs are adhered to a face of the box rocker.

BRIEF DESCRIPTION OF THE DRAWINGS

The present disclosure will become more fully understood from the detailed description and the accompanying drawings, wherein.

DETAILED DESCRIPTION

Figure 1:
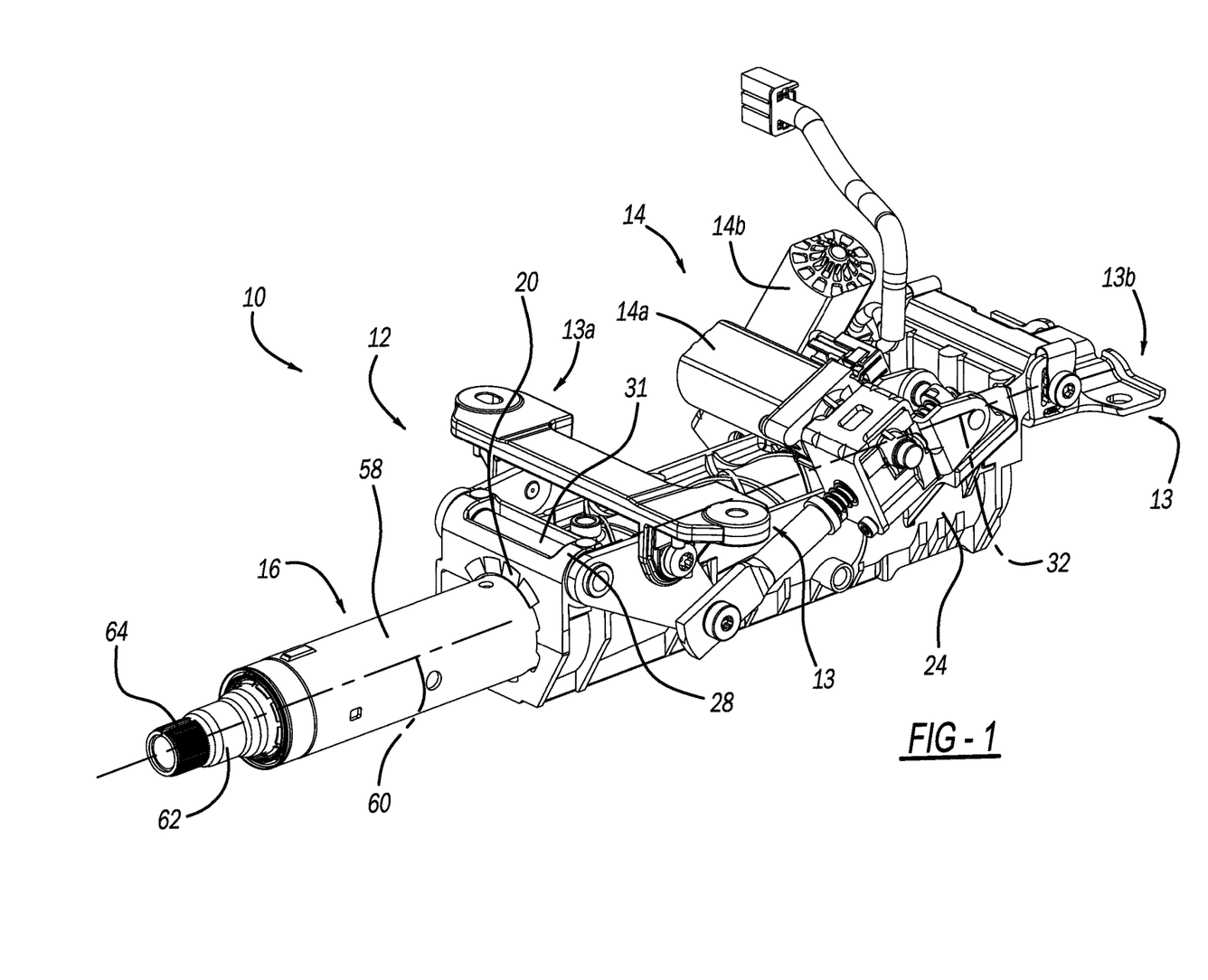
FIG. 1 is a top perspective view of a steering column assembly incorporating engineered tape between a box rocker inner diameter and a column jacket outer diameter and constructed in accordance to one embodiment of the present disclosure, the column jacket located in a first position relative to the box rocker.
Figure 2:
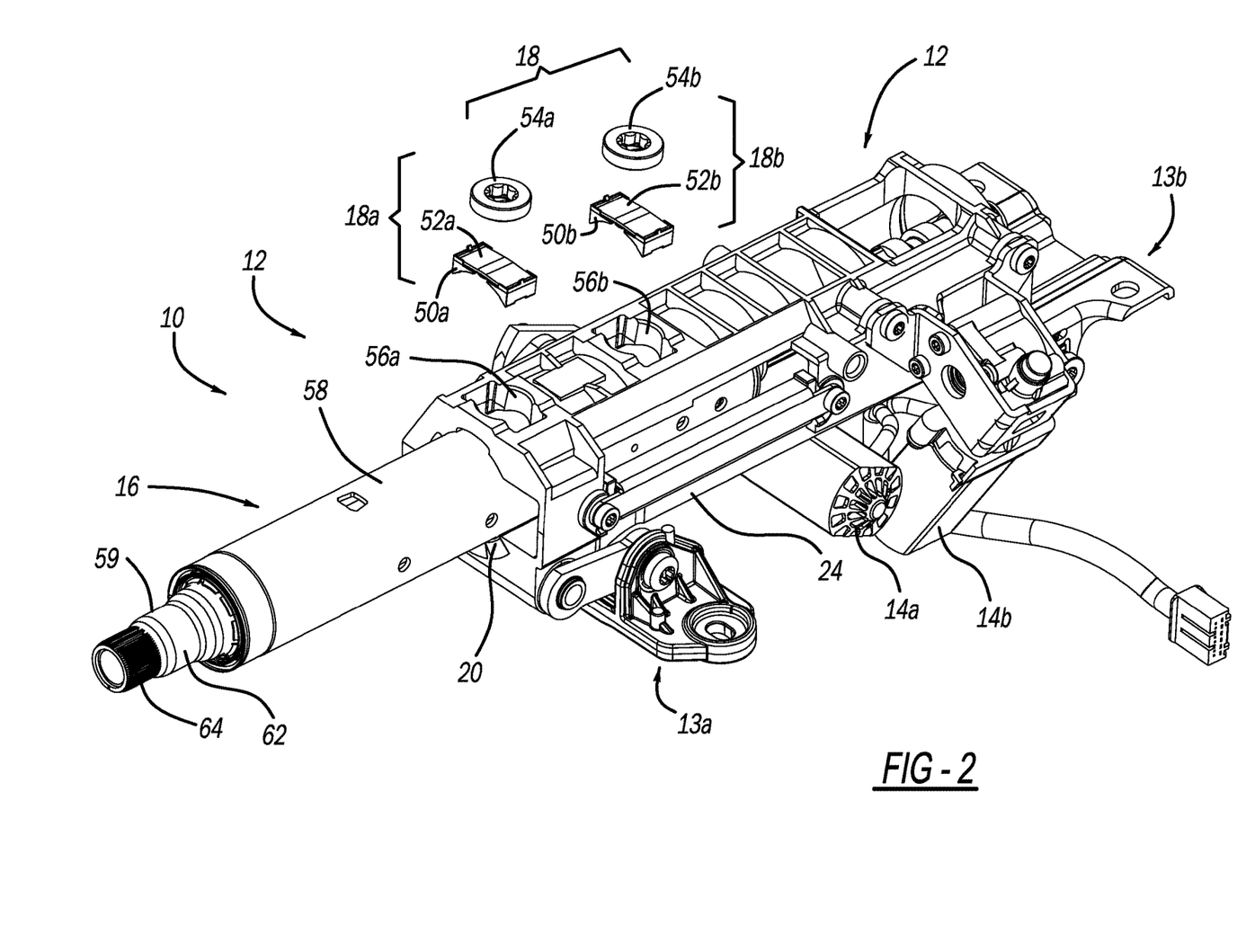
FIG. 2 is a bottom perspective view of the steering column assembly of FIG. 1.

With initial reference to FIGS. 1 and 2, a perspective view of a steering column assembly constructed in accordance to one embodiment of the present teachings is shown and generally identified at reference numeral 10. The steering column assembly 10 generally includes a box rocker 12 having a bracket assembly 13, an electric motor assembly 14, a column jacket 16, a biasing mount assembly 18 and engineered tape 20. The bracket assembly 13 includes a first bracket 13a and a second bracket 13b. The electric motor assembly 14 includes a first electric motor 14a and a second electric motor 14b. The first electric motor 14a is coupled with a first worm of a first worm gear, wherein the first worm meshes a first worm wheel. The first worm wheel comprises a first bore with a first outer thread. A first spindle engages into the thread of the first bore, wherein the first spindle is coupled with a height adjustment mechanism to adjust the column jacket 16 and the box rocker 12 relative to the first bracket 13a. The second electric motor 14b is coupled with a second worm of a second worm gear, wherein the second worm meshes a second worm wheel. The second worm wheel comprises a second bore with a second outer thread. A second spindle engages into the thread of the second bore, wherein the second spindle is coupled with a length adjustment mechanism to adjust the column jacket 16 relative to the box rocker 12 along a longitudinal column jacket axis 60.

The biasing mount assembly 18 includes a pair of biasing mounts 18a and 18b that are adjustably mounted on the box rocker 12 and configured to urge the column jacket 16 toward the engineered tape 20 disposed on an opposite side of the box rocker 12 as will be described in greater detail herein. The first and second brackets 13a and 13b are configured to accept fasteners for mounting the steering column assembly 10 relative to a vehicle. The first and second electric motors 14a and 14b are configured to alter an orientation of the box rocker 12 and column jacket 16 relative to a driver in a vehicle. It will be appreciated that the configuration of the motor assembly 14 and bracket assembly 13 is merely exemplary and other arrangements may be used for the steering column assembly 10 within the scope of the present disclosure.

Figure 3:
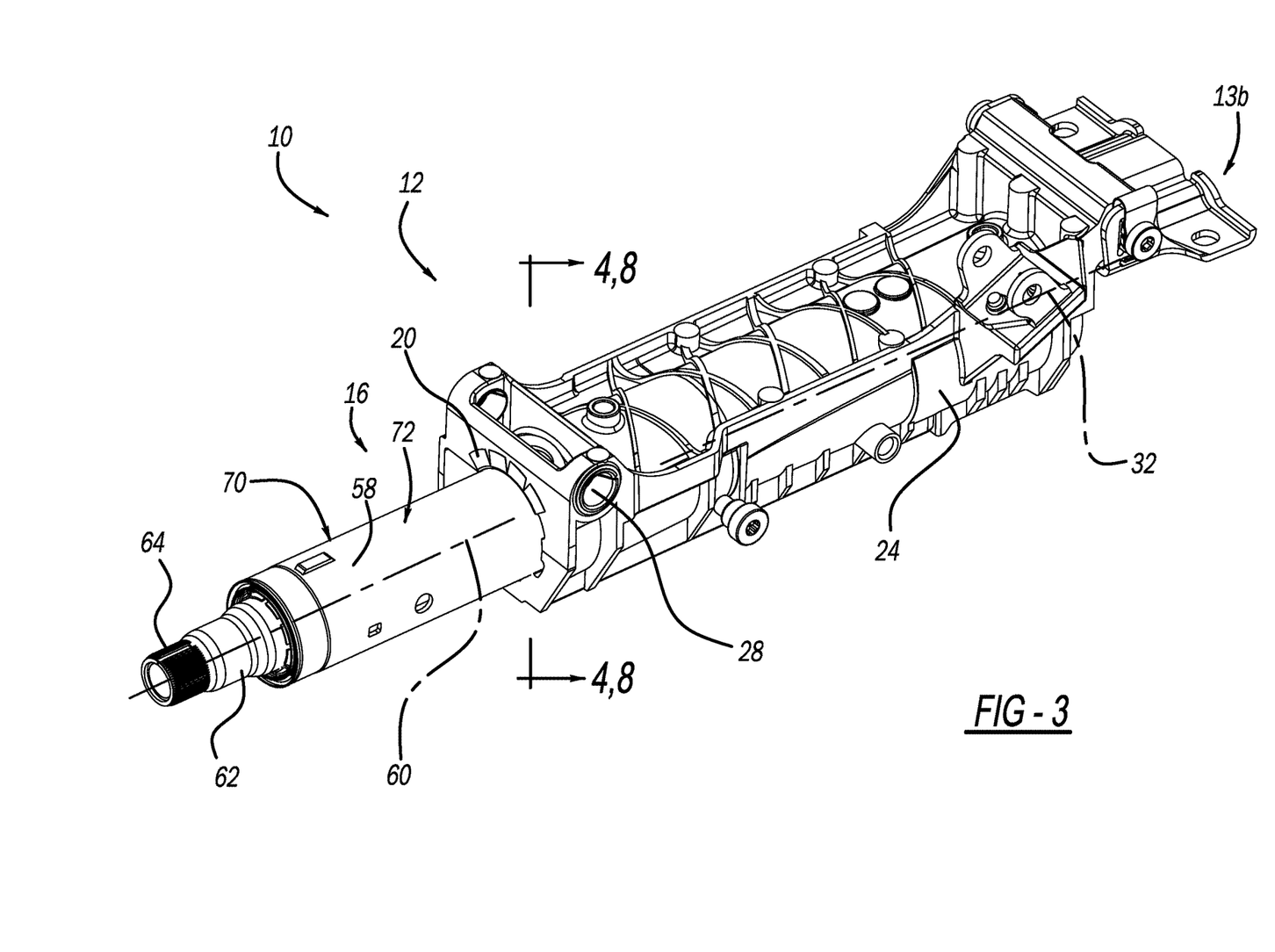
FIG. 3 is a perspective view of the steering column assembly of FIG. 1 and shown with the column jacket moved in a second position relative to the box rocker.
Figure 4:
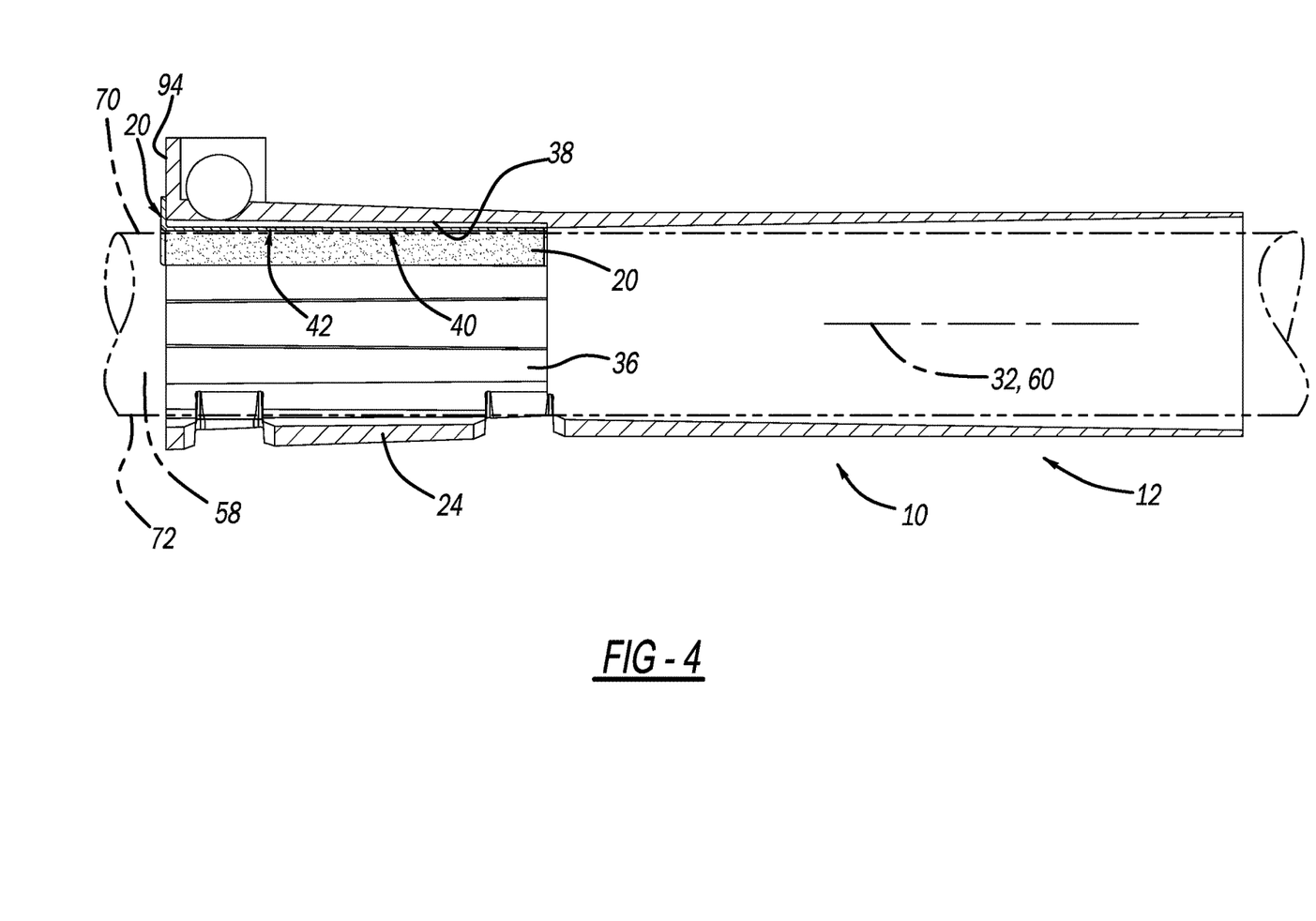
FIG. 4 is a partial cross-sectional view of the steering column assembly taken along lines 4-4 of FIG. 3.

The column jacket 16 is configured to telescope relative to the box rocker 12 between the positions shown in FIG. 1 and FIG. 3. As will be described in greater detail herein, the engineered tape 20 is positioned between the box rocker 12 and the column jacket 16 to mitigate wear between the box rocker 12 and column jacket 16 and to provide other benefits as explained below.

Figure 5:
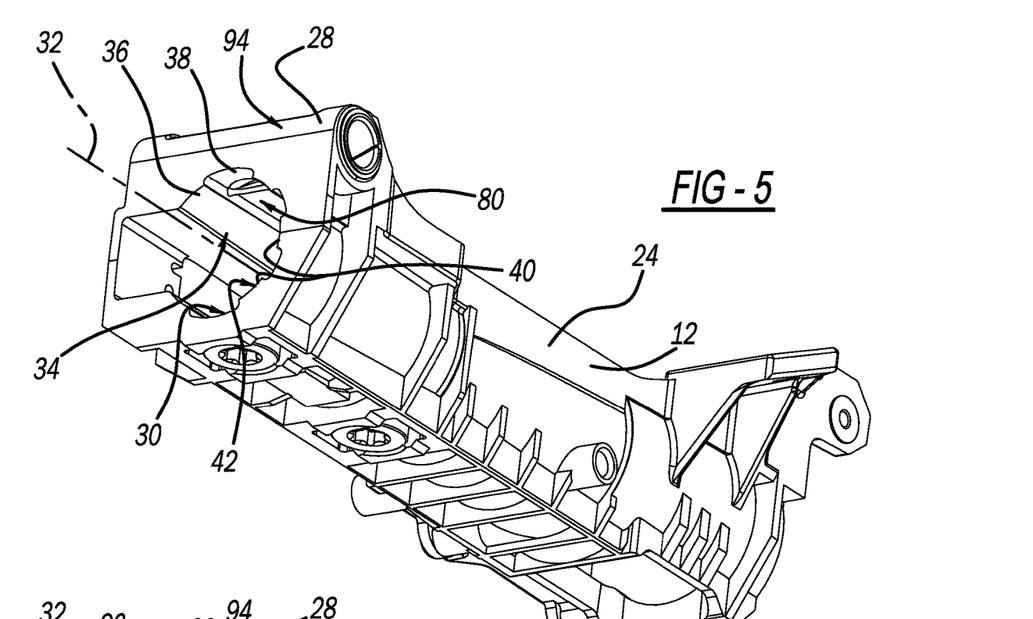
FIG. 5 is a perspective view of the box rocker of FIG. 1 and shown without the engineered tape.
Figure 9:
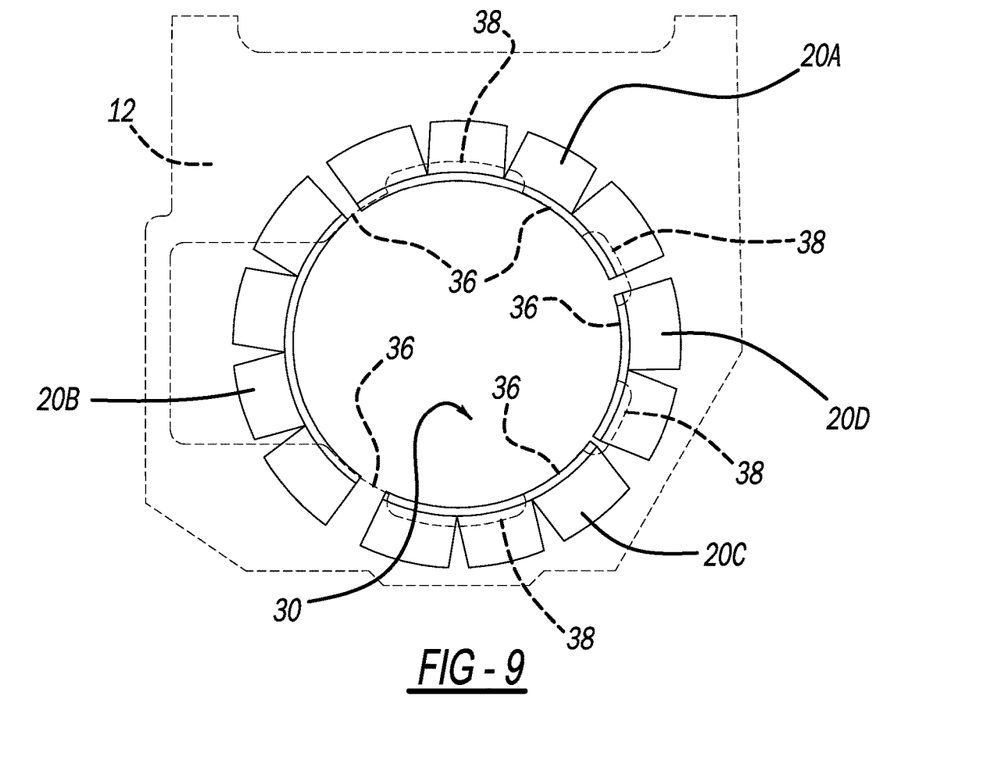
FIG. 9 is an end view of a box rocker incorporating engineered tape positioned at additional locations according to various implementations of the present disclosure.

With particular reference to FIGS. 1, 5 and 9, the box rocker 12 will be further described. The box rocker 12 comprises a rocker body 24 that includes a mounting bore 28 and generally defines a box rocker bore 30. The mounting bore 28 is configured to receive a mounting axle 31 that couples with the bracket 13a to facilitate mounting of the box rocker 12 to the vehicle. The box rocker bore 30 extends along a bore axis 32 and is generally defined by a fluted section 34 provided by a plurality of radially stepped in surfaces 36 and a plurality of radially stepped out surfaces 38. The plurality of stepped in surfaces 36 collectively provide a box rocker inner surface 40 along a box rocker inner diameter 42. The box rocker inner surface 40 slidably receives the column jacket 16 as will be understood below. While five stepped in surfaces 36 and four stepped out surfaces 38 are shown, it is appreciated that additional or fewer stepped in and out surfaces 36, 38 may be provided. It is further appreciated that the stepped in and out surfaces 36, 38 may take other geometries within the scope of the present disclosure. Moreover, it will be appreciated that the inner surface 40 may take on a continuous circumferential surface without any fluting.

With reference now to FIG. 2, the biasing mount assembly 18 will be described in greater detail. Both of the biasing mount assemblies 18a, 18b include a pad 50a, 50b; a biasing member 52a, 52b and a screw 54a, 54b. The biasing members 52a and 52b bias the respective pads 50a and 50b into the column jacket outer diameter. The biasing mount assemblies 18 locate into arc shaped screw holes 56a and 56b defined in the column jacket 16. The screws 54a and 54b facilitate mounting of the biasing mount assemblies 18a and 18b to the column jacket 16.

With particular reference now to FIGS. 1-4, the column jacket 16 will be further described. The column jacket 16 generally includes an inner jacket tube 58 and a steering shaft 59. The column jacket 16 extends along a longitudinal column jacket axis 60. The steering shaft 59 includes a steering spindle 62 having a steering wheel mounting feature 64 arranged on a distal end thereof. The steering wheel mounting feature 64 includes threads and a splined portion however other arrangements are contemplated.

The inner jacket tube 58 includes a column jacket outer diameter 70 having an outer surface 72 that opposes the box rocker inner surface 40. In some instances the box rocker 12 can be referred to as an outer jacket that receives the inner jacket (tube) 58. The outer surface 72 can have a generally cylindrical profile however other geometries are contemplated for receipt into the box rocker bore 30. For example, the box rocker 12 and column jacket 16 can define other complementary shapes such as, but not limited to, hexagonal within the scope of this disclosure. In some example shown in FIGS. 1-4 and 6, the engineered tape 20 is disposed partially onto the inner surface 40. In the example shown, the engineered tape 20 is disposed onto some of the radially stepped in surfaces 36. In this example, the engineered tape 20 is at least partially adhered to radially stepped in surfaces 36 located generally around an upper circumference of the box rocker bore 30. As used herein "upper" circumference is used as a reference to an orientation the steering column assembly 10 has while assembled onto a vehicle.

During translation of the column jacket 16 within the box rocker bore 30, the outer surface 72 of the inner jacket tube 58 of the column jacket 16 is caused to slidably ride along the engineered tape 20 on the inner surface 40 of the box rocker 12. Because the engineered tape 20 is positioned between the outer surface 72 and the inner surface 40, direct sliding contact between the outer surface 72 of the column jacket 16 and the inner surface 40 of the box rocker 12 is significantly reduced. The engineered tape 20 can significantly reduce wear between the column jacket 16 and the box rocker 12. Further, the arrangement can reduce shavings, debris and other particles that can drop or otherwise discharge onto the mating surfaces of the column jacket 16 and box rocker 12. Such an arrangement is particularly advantageous when dissimilar materials are used for the column jacket 16 and box rocker 12. For example, the implementation of engineered tape 20 reduces wear patterns seen between steel column jackets and magnesium box rockers.

Figure 10:
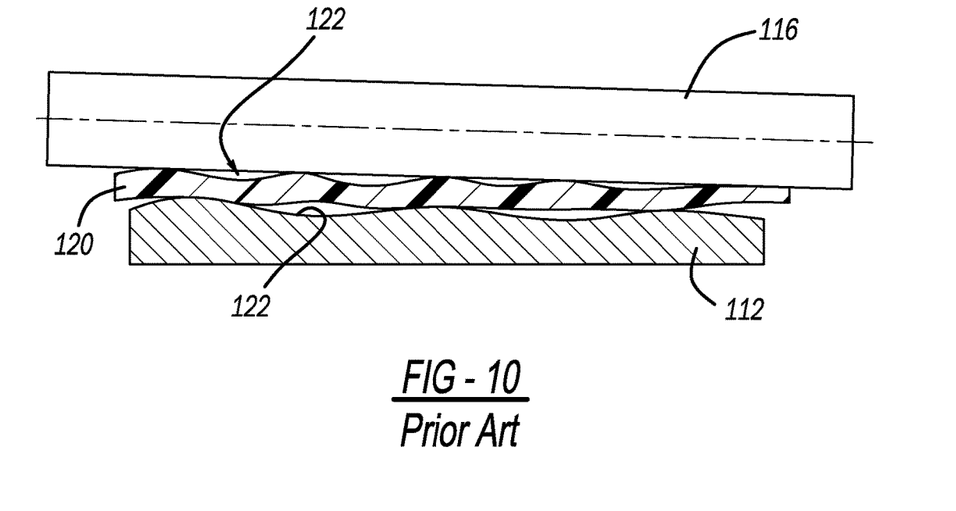
FIG. 10 is a cross-sectional view of a box rocker, column jacket and metal sleeve or rigid plastic sleeve according to Prior Art.
Figure 11:
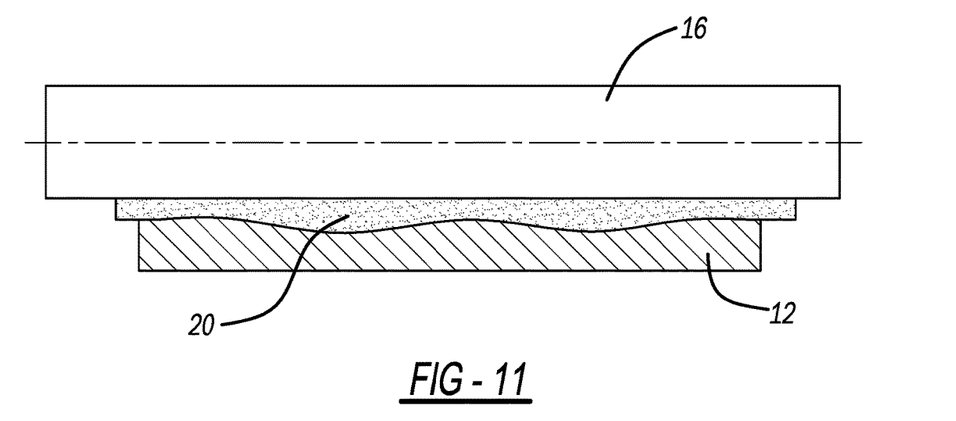
FIG. 11 is a cross-sectional view of a box rocker, column jacket and engineered tape according to one example of the present disclosure.

In one advantage of the instant disclosure, the engineered tape 20 is highly flexible and compressible. The engineered tape 20 can compress, flow and adjust into rigid part surface irregularities such as, but not limited to, roughness, grooves, pockets, pin-holes surface waves and tool marks. In this regard, the engineered tape 20 can provide better axis alignment, control and cooperation between moving parts and improve stiffness between the column jacket 16 and box rocker 12. A comparison is shown in FIGS. 10 and 11. FIG. 10 is a Prior Art example of a box rocker 112 and a column jacket 116 having a rigid member such as a plastic or metal sleeve 120 arranged therebetween according to one example of Prior Art. In the Prior Art arrangement shown in FIG. 10, gaps and/or voids 122 can exist between the box rocker 112, column jacket 116 and sleeve 120. In comparison, turning to FIG. 11, the box rocker 12, column jacket 16 and engineered tape 20 substantially eliminates such gaps. Explained further, because the engineered tape compresses, a more intimate contact results between the outer surface 72 of the column jacket 16 and the inner surface 40 of the box rocker 12. As a result, voids gaps and surface irregularities are filled. Moreover, stiffness and axis alignment of the overall steering column 10 is improved.

With particular reference now to FIGS. 5-8, the engineered tape 20 will be further described. As is known, engineered tape 20 is flexible, compressible and easily cut to a desired shape. It will be appreciated that the term "tape", can also be referred to as "film". In this way, "tape" is used herein to encompass film or other materials having similar characteristics with respect to the engineered tape 20. In this regard, the engineered tape 20 does not have pre-defined rigid forms, highly defined shapes, or high tolerance geometries. In this regard, the engineering tape 20 can match rigid mating radii, slots, bores, posts, grooves, or other surfaces of a box rocker. Cost reductions and savings can be realized from the engineered tape 20 as it is more easily assembled when cut from a roll or sheet and placed quickly onto a surface (such as the inner surface 40). The engineered tape 20 does not have to closely match rigid part geometries, thus reducing highly machined and tolerance part geometry mismatches. The engineered tape 20 can overlap features, cover a desired footprint, be manipulated into positions and adjusted quickly to assemble and perform acceptably. The engineered tape 20 can be quickly cut to provide a wide variety of footprints as compared to rigid defined shape metal, hard resin pre-molded or other rigid machined, bent, turned or hard formed components.

Figure 6:
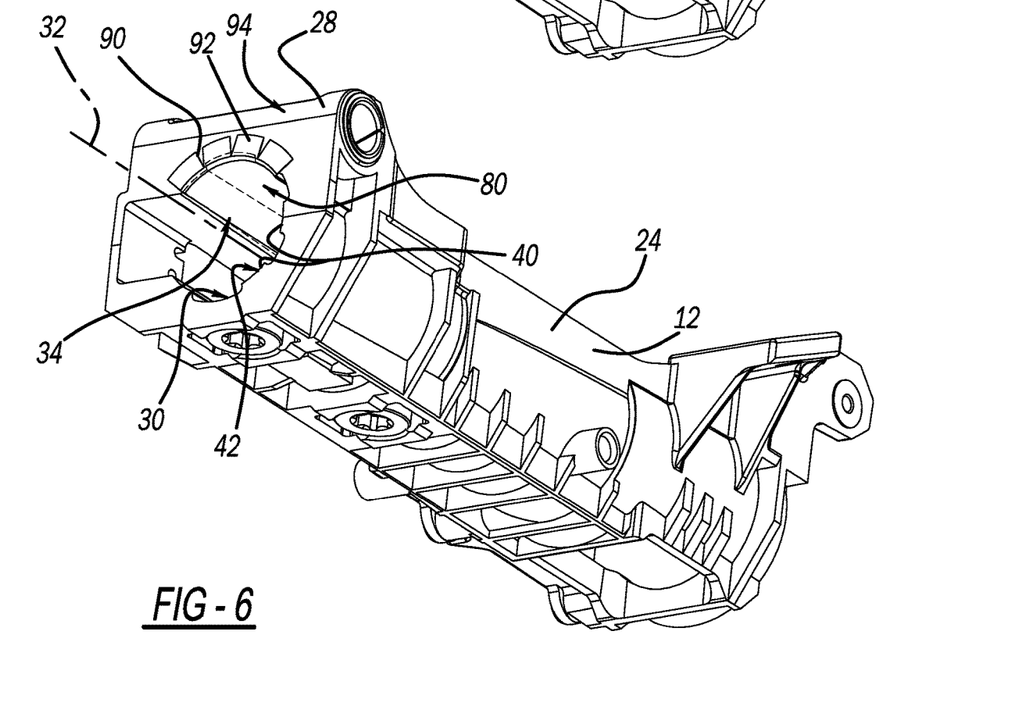
FIG. 6 is a perspective view of the box rocker of FIG. 1 and shown with the engineered tape positioned in a first location according to one example of the present disclosure.
Figure 7:
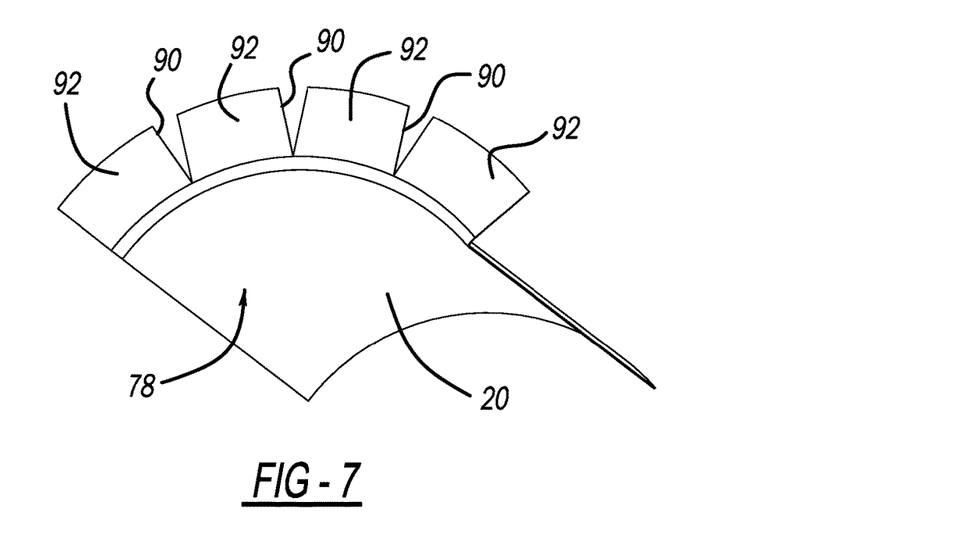
FIG. 7 is a front perspective view of the engineered tape shown disposed on the box rocker of FIG. 1.
Figure 8:
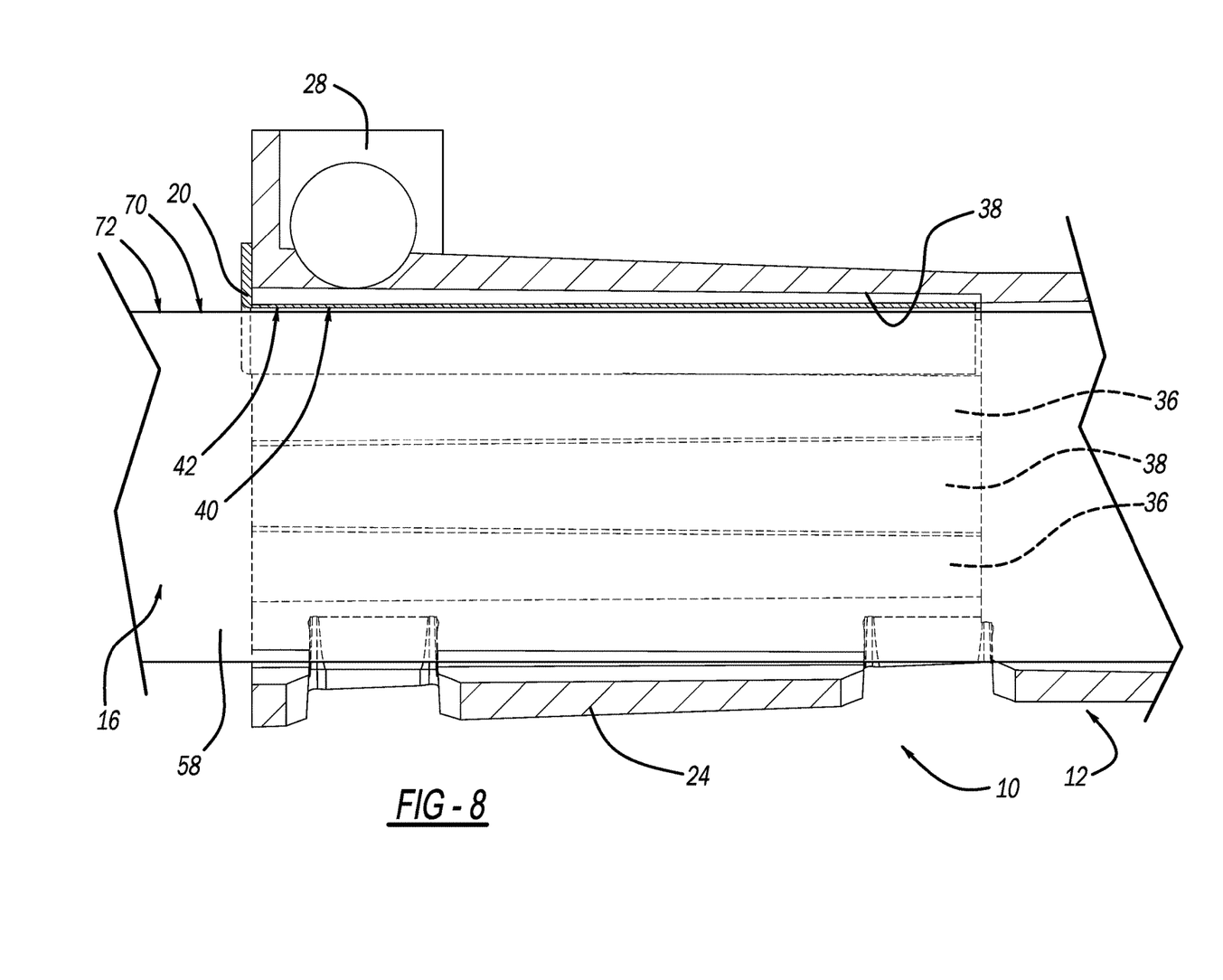
FIG. 8 is a partial cross-sectional view of the steering column assembly taken along lines 8-8 of FIG. 3.

In the particular example shown in FIGS. 6 and 7, the engineered tape 20 has been cut generally into a shape having a footprint 78 suitable to place onto an area 80 of the inner surface 40. The area 80 can be defined as any area where wear protection is desired. The engineered tape 20 also has slots 90 cut thereon that generally create tabs 92 that can adhere to a face 94 of the box rocker 12. It will be appreciated that the engineered tape 20 does not necessarily need to be adhered to the face 94. In some examples the engineered tape 20 can be adhered to the face 94 as a visual indicator that installation of the engineered tape 20 has been completed. The engineered tape 20 can be adhered to the radially stepped in surfaces 36 around the inner surface 40. While not required, in some examples, the engineered tape 20 can additionally adhere to the radially stepped out surfaces 38. In other examples, some or all of the engineered tape 20 can alternatively be adhered to the outer surface 72 of the column jacket 16.

Again, it is appreciated that the engineered tape 20 can be cut into any size suitable for a given application. It is further appreciated that multiple sections of engineered tape 20A, 20B, 20C and/or 20D may be placed around the inner diameter 42 onto the inner surface 40. It may be desirable to use some or all sections of engineered tape 20A, 20B, 20C and/or 20D depending on application. It is further contemplated that some or all of the sections of engineered tape 20A, 20B, 20C and/or 20D may be placed in other locations and/or be cut into different geometries within the scope of the present disclosure.

The engineered tape 20 can comprise any suitable tape or film that provides satisfactory compression and wear characteristics. Exemplary engineered tapes include, but are not limited to, McMaster Carr Tape 2208T72 marketed by Integument Technologies, Inc. and having product number P550W-A4-36. The McMaster Carr tape includes an oxyfluoropolymer of polytetrafluoroethylene modified to incorporate hydroxyl groups with an acrylic or silicone pressure sensitive adhesive. Other suitable tapes include tape marketed by Shenzhen Western Hemisphere Technology Co., Ltd., Part No. WH-013. The tape may be formed of glass fiber or Teflon®. In some non-limiting examples, the tape can have a thickness between 0.05 mm and 0.5 mm, preferably between 0.1 mm and 0.2 mm and especially preferred between 0.12 mm and 0.18 mm. The tape can further have surface conformance and tape compression between 0.01 to 0.05 mm. In some examples the tape can compress generally between 20% and 25% and in some instances between approximately 5% and 35%.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. In this regard, the ordering of method steps is not necessarily fixed, but may be capable of being modified without departing from the instant teachings. Such variations are not to be regarded as a departure from the disclosure, and all such modifications are intended to be included within the scope of the disclosure.

What is claimed is:

1. A steering column assembly for a motor vehicle, the steering column assembly comprising:
   a box rocker having a rocker body including a box rocker inner surface that defines a box rocker bore, the box rocker configured to be fixed relative to the motor vehicle in an assembled position;
   a column jacket configured to be slidably received into the box rocker bore, the column jacket having a column jacket outer diameter including an outer surface that opposes the box rocker inner surface the column jacket being translatable within the box rocker bore between first and second positions; and
   a first section of tape disposed between the box rocker inner surface and the column jacket outer surface wherein the first section of tape mitigates wear between the column jacket and the box rocker during translation of the column jacket within the box rocker bore.

2. The steering column assembly of claim 1 wherein the first section of tape is at least partially adhered to the box rocker inner surface.

3. The steering column assembly of claim 2 wherein the first section of tape is further adhered to a face surface of the box rocker body.

4. The steering column assembly of claim 2 wherein the first section of tape is positioned generally around an upper circumference of the box rocker bore.

5. The steering column assembly of claim 4 wherein the first section of tape is configured to compress between 20% and 25%.

6. The steering column assembly of claim 1 wherein the box rocker includes a fluted section provided by a plurality of radially stepped in surfaces and a plurality of radially stepped out surfaces, the plurality of stepped in surfaces collectively providing the box rocker inner surface.

7. The steering column assembly of claim 6 wherein the first section of tape is positioned onto at least two adjacent radially stepped in surfaces of the plurality of radially stepped in surfaces.

8. The steering column assembly of claim 1 wherein the inner surface of the box rocker and the outer surface of the column jacket are substantially concentric.

9. The steering column assembly of claim 1 wherein the column jacket is configured to translate within the box rocker bore, wherein during translation, the outer surface of the column jacket is caused to slidably ride along the first section of tape disposed on the inner surface of the box rocker.

10. The steering column assembly of claim 1 wherein the column jacket is formed of steel and the box rocker is formed of magnesium.

11. The steering column assembly of claim 4 wherein the first section of tape has a thickness of between 0.05 mm and 0.5 mm.

12. The steering column assembly of claim 11 wherein the first section of tape has a thickness of between 0.1 mm and 0.2 mm.

13. The steering column assembly of claim 12 wherein the first section of tape has a thickness of between 0.12 mm and 0.18 mm.

14. The steering column assembly of claim 4 wherein the first section of tape has one of acrylic and silicone pressure sensitive adhesive.

15. The steering column assembly of claim 4, further comprising a second section of tape, distinct from the first section of tape and disposed between the box rocker inner surface and the column jacket outer surface.

16. The steering column assembly of claim 15 wherein the first and second sections of tape are of different geometries having distinct footprints.

17. The steering column assembly of claim 15, further comprising a third section of tape, distinct from the first and second sections of tape and disposed between the box rocker inner surface and the column jacket outer surface.

18. A method of assembling a column jacket relative to a box rocker of a steering column assembly for a motor vehicle, the method comprising:
identifying a mating contact surface of the box rocker;
disposing a first section of tape onto an inner surface of the box rocker at the mating contact surface; and
slidably inserting the column jacket into a bore defined by the inner surface of the box rocker wherein an outer surface of the column jacket slidably advances along the first section of tape mitigating surface to surface contact between the column jacket and the box rocker.

19. The method of claim 18 wherein disposing the first section of tape comprises:
cutting the first section of tape from one of a roll and sheet, the first section of tape corresponding to a desired area of the inner surface of the box rocker.

20. The method of claim 19 wherein disposing the first section of tape further comprises:
cutting slots into the tape to create tabs; and
adhering the tabs to a face of the box rocker.

* * * * *